(12) United States Patent
Pfeiffer et al.

(10) Patent No.: US 11,900,685 B2
(45) Date of Patent: Feb. 13, 2024

(54) QUICK IDENTIFICATION OF HAZARDOUS OR AT-RISK OBJECTS IN THE SURROUNDINGS OF A VEHICLE

(71) Applicant: Robert Bosch GmbH, Stuttgart (DE)

(72) Inventors: Michael Pfeiffer, Schoenaich (DE); Jochen Marx, Emmerke (DE); Oliver Lange, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 564 days.

(21) Appl. No.: 16/972,590

(22) PCT Filed: Jun. 6, 2019

(86) PCT No.: PCT/EP2019/064875
§ 371 (c)(1),
(2) Date: Dec. 6, 2020

(87) PCT Pub. No.: WO2020/007567
PCT Pub. Date: Jan. 9, 2020

(65) Prior Publication Data
US 2021/0241000 A1 Aug. 5, 2021

(30) Foreign Application Priority Data
Jul. 4, 2018 (DE) .......................... 102018211042.5

(51) Int. Cl.
*G06K 9/00* (2022.01)
*B60W 30/08* (2012.01)
(Continued)

(52) U.S. Cl.
CPC ............. *G06V 20/56* (2022.01); *B60W 30/08* (2013.01); *G06V 20/64* (2022.01); *B60W 2420/403* (2013.01); *B60W 2552/05* (2020.02)

(58) Field of Classification Search
CPC ....... G06V 20/56; G06V 20/64; B60W 30/08; B60W 2552/05; B60W 2420/403
See application file for complete search history.

(56) References Cited

U.S. PATENT DOCUMENTS

| 2016/0096477 A1* | 4/2016 | Biemer | ................. H04N 23/60 348/148 |
| 2019/0236862 A1* | 8/2019 | Mercep | ................. G08G 1/165 |

FOREIGN PATENT DOCUMENTS

| DE | 102008062915 A1 | 7/2010 |
| DE | 102014005186 A1 | 10/2014 |

(Continued)

OTHER PUBLICATIONS

Milde, Moritz B., et al. "Bioinspired event-driven collision avoidance algorithm based on optic flow." 2015 International Conference on Event-based Control, Communication, and Signal Processing (EBCCSP). IEEE, 2015. (Year: 2015).*

(Continued)

*Primary Examiner* — Bobbak Safaipour
*Assistant Examiner* — Jongbong Nah
(74) *Attorney, Agent, or Firm* — NORTON ROSE FULBRIGHT US LLP; Gerard A. Messina

(57) ABSTRACT

A method for identifying potentially hazardous or at-risk objects in the surroundings of a vehicle. The method includes detecting an area of the surroundings using at least one event-based sensor, the event-based sensor including light-sensitive pixels, and a relative change of the light intensity incident upon a pixel by at least a predefined percentage prompting the sensor to output an event assigned to this pixel. The method also includes assigning events output by the sensor to objects in the area; analyzing, for at least one object to which events are assigned, the events assigned to the object with respect to present movements of the object; and ascertaining an impending movement of the (Continued)

object, and/or an impending change of state, of the object from the present movements. An associated computer program is also described.

13 Claims, 2 Drawing Sheets

(51) Int. Cl.
*G06V 20/56* (2022.01)
*G06V 20/64* (2022.01)

(56) References Cited

FOREIGN PATENT DOCUMENTS

| DE | 102013226336 A1 | 6/2015 |
|---|---|---|
| WO | 2018078713 A1 | 5/2018 |

OTHER PUBLICATIONS

Cho, Hyunggi, et al. "A multi-sensor fusion system for moving object detection and tracking in urban driving environments." 2014 IEEE International Conference on Robotics and Automation (ICRA). IEEE, 2014. (Year: 2014).*

International Search Report for PCT/EP2019/064875, dated Sep. 10, 2019.

Milde Moritz B et al., "Bioinspired Event-Driven Collision Avoidance Algorithm Based on Optic Flow," 2015 International Conference on Event-Based Control, Communication, and Signal Processing (EBCCSP), IEEE, 2015, pp. 1-7. Downloaded on Dec. 4, 2020.

Soheila Dadelahi, et al., "Obstacle Displacement Prediction for Robot Motion Planning and Velocity Changes," International Journal of Information and Electronics Engineering, IJIEE, vol. 3, No. 3, 2013, pp. 1-5. Downloaded on Dec. 4, 2020.

Lichtsteiner, et al.: "A 128×128 120 dB 15 ms Latency Asynchronous Temporal Contrast Vision Sensor", IEEE Journal of Solid-State Circuits, 43(2), (2008), pp. 566-576, XP011200748.

\* cited by examiner

QUICK IDENTIFICATION OF HAZARDOUS OR AT-RISK OBJECTS IN THE SURROUNDINGS OF A VEHICLE

FIELD

The present invention relates to a method by which it is possible to quickly analyze objects in the surroundings of a vehicle as to whether they are hazardous for the vehicle or, conversely, are put at risk by the vehicle.

BACKGROUND INFORMATION

An analysis of past traffic accidents has shown that a large percentage of these accidents could have been avoided had only a little more time been available to avert them. One second, or even less, of additional time would have made the difference in many instances.

Vehicles are increasingly equipped with assistance systems, which in the event of an impending collision respond automatically and, for example, initiate an emergency brake application. Such automatic responses are additionally necessary when vehicles are to move in an at least semi-automated manner on public roads.

To save preferably much response time, U.S. Patent Application Publication No. US 2016/096 477 A1 provides using a sensor including event-based light-sensitive pixels. As soon as the light intensity incident upon such an event-based pixel changes by at least a predefined percentage, the sensor outputs an event assigned to this pixel. In contrast to a camera-based sensor, it is not necessary to await the recording of a complete image.

SUMMARY

Within the scope of the present invention, a method for identifying potentially hazardous or at-risk objects in the surroundings of a vehicle is provided. In this connection, "hazardous" shall, in particular, be understood to mean that a collision of the object with the vehicle is imminent and may result in disadvantages for the vehicle, for its occupants and/or for other road users. "At-risk" shall, in particular, be understood to mean that a collision of the object with the vehicle is imminent and may result in disadvantages for the object itself.

In accordance with an example embodiment of the present invention, an area of the surroundings is detected with the aid of at least one event-based sensor, the event-based sensor including light-sensitive pixels, and a relative change of the light intensity incident upon a pixel by at least a predefined percentage prompting the sensor to output an event assigned to this pixel. The detected area may, for example, be an area toward which the vehicle is instantaneously heading. In particular, the surroundings of the vehicle may be covered by multiple event-based sensors, of which at any point in time those are used which are relevant for the instantaneous driving direction (in particular driving forward or backing up). However, it is also possible to monitor lateral areas, for example. In the case of a vehicle stopping on the shoulder, the rear traffic space may, for example, also be monitored as to whether a vehicle is at risk of leaving the near side lane in the direction of the shoulder.

Events output by the sensor are assigned to at least one object in the area. Objects may, in particular, be ascertained from the data stream of the events themselves. For example, initially the objects which are distinguishable from one another and moving independently of one another may be detected as such in an abstract manner, to then, in the next step, be classified according to object types (such as pedestrian, bicyclist or another motor vehicle). As an alternative or also in combination, however, it is possible to use any other source for the information as to which objects are present in the surroundings of the vehicle. For example, the events may also be assigned to objects which were previously detected and classified utilizing a camera sensor. Furthermore, it is possible that one and the same event is assigned to multiple objects, for example when the objects overlap from the perspective of the event-based sensor. At the same time, however, it is not absolutely necessary that every event output by the sensor is assigned to at least one object. Events may also remain without assignment.

For at least one object to which events are assigned, the events assigned to the object are analyzed with respect to present movements of the object. These present movements may, for example, be on-the-spot movements of the object, or also other movements, which take place on a short time scale compared to the typical frame rate of camera sensors. In this connection, the term of the on-the-spot movement encompasses, in particular, movements which leave the position of the object as a whole in the space unchanged. These are, in particular, movements in which at least one point of the object in the space remains fixed.

From the present movements, an impending movement of the object and/or an impending change of state of the object is/are ascertained. The impending movement may, in particular, be a locomotion of the object as a whole, for example. However, it is also possible, for example, to first ascertain an impending second on-the-spot movement from a first on-the-spot movement, and to only infer an impending locomotion of the object as a whole from this second on-the-spot movement. The term of the change of state encompasses, for example, any change of the object which is not a locomotion of the object as a whole, but is nonetheless relevant from the perspective of the vehicle. For example, a movement of a trunk lid on a preceding passenger car may indicate that cargo from the trunk will fall onto the roadway. In addition, for example the bending or breaking of a mounting with the aid of which a roof box or other luggage is attached on the preceding passenger car indicates that this luggage will be lost soon.

It was found that many movements or changes of state of objects only seemingly come as a complete surprise, but in reality are presaged by corresponding on-the-spot movements of these objects or also other movements which occur on a short time scale compared to the frame rate of camera sensors. For example, the stride length, or also the frequency of the swinging movement of the arms, of a walking person changes before the pace of the person noticeably increases. A bicyclist will stop pedaling before he or she decelerates his or her bicycle, and accelerate his or her pedaling speed before the bicycle as a whole noticeably accelerates. Furthermore, in order to be able to walk in a different direction, a person in general has to rotate about his or her own axis to align with the desired direction and then be able to continue his or her path in this direction. In this way, at least one on-the-spot movement is thus advantageously selected as the present movement of the object.

This realization is not limited to animate objects. For example, upon closer examination, losing vehicle parts or cargo on the expressway, which is very hazardous for following traffic, is frequently not a suddenly occurring event. Rather, corresponding attachments usually loosen gradually, so that the vehicle part or the cargo initially has play to be excited, by the driving dynamics, to carry out a movement or vibration in relation to the remainder of the vehicle before the attachment finally fails completely.

Furthermore, the realization is also not limited to hazardous situations which arise accidentally. For example, it is also possible to identify the on-the-spot movement by which a person winds up to throw a rock onto a driving vehicle.

In this way, the ascertainment of the impending movement, or of the impending change of state, may in particular encompass the ascertainment of a particular underlying intention of the object, without being limited thereto.

The aforementioned on-the-spot movements may be very subtle and, at the same time, fast movements. It is therefore particularly advantageous to physically detect these movements with the aid of an event-based sensor. The event-based sensor supplies a continuous data stream: Each event is reported at exactly the moment at which it takes place. A discretization of the time in the form of a frame rate, as in the case of a camera sensor, is not fixedly predefined. The consequence of this, on the one hand, is that the on-the-spot movements may be tracked in considerably greater detail. On the other hand, it is possible to respond considerably more quickly overall, i.e., also in less than the time which elapses in the case of a camera sensor between the recordings of two complete images (frames). In addition to the faster reporting of the events, this is helped by the fact that the events only relate to changes of the instantaneous situation from the outset. It is not necessary to spend time on initially evaluating what has changed, for example from the comparison of two images.

Compared to a video data stream of a camera sensor, the data stream of the events supplied by an event-based sensor is very heavily compressed. During the transmission of the data within the vehicle and during the further processing, less bandwidth is thus needed. If, for example, a CAN bus having a maximum bandwidth of 1 Mbit/s is used as a transmission channel, it would already be working at full capacity with the transmission of a video data stream in HD quality.

For example, a ruleset which is based on a canon of predefined primitives of on-the-spot movements may establish the connection between the on-the-spot movements and the predicted movement or change of state. This ruleset may be explicitly formulated, but may also, for example, be trained using machine learning. Such a rule may, for example, include that, in the case of a pedestrian walking on the sidewalk, it is to be expected with high likelihood that the pedestrian will step onto the roadway from the combination of a changed step frequency and a body rotation toward the roadway.

An object is advantageously assessed as hazardous or at-risk in response to the impending movement of the object conflicting with the present or planned trajectory of the vehicle. One criterion for this may be, for example, that the impending movement of the object intersects the present or planned trajectory of the vehicle or comes closer to it than a predefined safety distance. When the impending movement does not affect the vehicle in this way, it may be classified as non-critical. It is then possible, for example, to save further resources for tracking this movement in order to focus these resources on more relevant movements of further objects.

An object is advantageously assessed as hazardous or at-risk in response to the impending change of state of the object having a potential to cause a conflict between at least a portion of the object and the present or planned trajectory of the vehicle. This includes, for example, the aforementioned opening trunk lid or the breaking mounting on the preceding passenger car since cargo of this passenger car may then end up in the trajectory of the host vehicle.

In one further particularly advantageous embodiment, rigid objects are excluded from the analysis with respect to on-the-spot movements and the subsequent evaluation of the on-the-spot movements. In the process, rigid objects may, in particular, be objects in which on-the-spot movements do not normally occur or are not relevant from the perspective of the vehicle, for example because they are not suitable for putting the vehicle at risk. For example, except for the described special case of an impending loss of cargo, a passenger car is normally to be regarded as a rigid object. If, for example, the rear window wiper of the preceding passenger car is moving, this is not suitable for impairing the safety of the host vehicle, so that it is not necessary to tie up resources for tracking this movement.

In particular, the exclusion of rigid objects from the analysis with respect to on-the-spot movements and the subsequent evaluation of the on-the-spot movements may be activated as a function of the road category of the road instantaneously negotiated by the vehicle. In this way, it is possible to prioritize the available processing resources.

For example, the risk that cargo is lost and a following vehicle is seriously damaged is comparatively low in city traffic. In contrast, it occurs more frequently that pedestrians suddenly step in front of vehicles, the injury for the pedestrian possibly being serious. It may therefore be advantageous, for example, to activate the aforementioned exclusion of rigid objects in city traffic.

In contrast, pedestrians are encountered rather rarely on the expressway. In contrast, it occurs more frequently there that cargo is lost at high speed. It may therefore be advantageous on the expressway to also normally monitor rigid objects such as passenger cars or trucks for on-the-spot movements.

In a generalization of the above-described examples, a person or an animal is advantageously selected as the object, whose on-the-spot movements are ascertained. An impending movement and/or a change of state of the person or animal is ascertained from a change in the amplitude and/or frequency of a periodic movement of at least one body part of the person or animal and/or from a rotation of the person or animal or of a body part thereof as the on-the-spot movement. In particular, the analysis of periodic movements has the advantage that these movements may be distinguished well from noise.

In one further advantageous embodiment of the present invention, a person is selected as the object, whose on-the-spot movements are analyzed. An impending movement of the person in a certain spatial direction is ascertained from movements which indicate a communication of the person in this spatial direction as on-the-spot movements.

The analysis of people as objects may, in particular, be relevant in situations in which it is to be predicted whether a person moving on a sidewalk in the direction of the roadway will stop at the roadside or prepare to cross the road. In this connection, it is also possible, for example, to use not only the presence, but also explicitly the absence of certain on-the-spot movements as a criterion for whether a collision is impending. If the pedestrian is moving toward the roadside, for example, and has previously turned the head in the direction of the approaching vehicle, the likelihood is high that he or she has seen the vehicle and will stop, so that no emergency brake application is necessary. If, however, the pedestrian has not turned the head and, for example, further on-the-spot movements which indicate the use of a smart phone are identifiable, it is to be assumed that the pedestrian does not even notice the traffic situation. In this way, an emergency brake application is advisable.

The analysis of animals as objects may, in particular, be relevant in situations in which game crossings take place. An animal at the roadside may possibly only reach the light cone of the driving light moments before the vehicle arrives, leaving only little time to evaluate the response of the animal to the light. The light may warn the animal before entering the roadway, but may just as well also trigger an escape reflex resulting in a jump onto the roadway.

Following what was described above, from an on-the-spot movement of the object which encompasses a movement or vibration of a portion of the object in relation to the remainder of the object, a detachment of the portion from the object is advantageously ascertained as an impending change of state of the object. In particular, vibrations which are triggered by the driving dynamics frequently take place on a time scale which is considerably faster than the typical frame rate of camera sensors. Based on the images supplied by camera sensors, it is thus not possible to clearly establish the vibration. Incidentally, it is not only possible to identify the imminent detachment of vehicle parts or cargo. For example, it is also possible to identify the movement of ice which has accumulated on the tarpaulin of a preceding truck, and it may be inferred from this that the truck could soon lose chunks of this ice.

In one particularly advantageous embodiment, in response to an object being assessed as hazardous or at-risk, a warning unit which is physically perceptible to the driver of the vehicle is activated, and/or a drive system, a steering system and/or a braking system of the vehicle is controlled by an intervention, to avoid a collision or to mitigate the consequences of a collision. For example, a deceleration maneuver and/or an evasive maneuver may be initiated. When a preceding vehicle loses cargo, it may also be initially sufficient, for example, to increase the distance from this preceding vehicle. When the traffic situation allows, however, it may also be useful, for example, to pass the preceding vehicle so as not to be hit by potentially lost cargo.

In one further particularly advantageous embodiment of the present invention, camera images of the area detected by the event-based sensor are additionally used for the identification of objects in the area, and/or for the segmentation of objects into individual parts. In this way, the strengths of both types of data collection may be combined with one another. In principle, it is possible to divide the object into multiple segments solely based on the data stream of the events; however, this is complicated by the fact that this data stream always only shows those areas of the object which are in the process of moving. In contrast, the entire object is visible on a camera image, and it is possible, for example, to utilize color contrasts between different parts of the object. Furthermore, a camera sensor, by virtue of the system, has a higher spatial resolution than an event-based sensor.

In this connection, it shall be noted that a more precise extraction of features of objects, as well as also a potential segmentation of objects into individual parts, does not necessarily have to precede the analysis of the present movements. The analysis may, for example, already run at a point in time at which the feature extraction or segmentation is not yet complete, based on a worst-case estimation of the object type, and be revised later, when the object is classified more precisely or segmented. In this way, it is also possible to meaningfully introduce additional information from camera images, which is not available until later.

In general, the combination of an event-based sensor with a camera-based sensor may offer the advantage that a diversity is introduced during the data collection and data processing, especially for the safety-relevant requirement in traffic. In particular, the respective detected or evaluated pieces of information may be subjected to a plausibility check with respect to one another. For example, the case may occur that a tree was erroneously classified as a pedestrian based on camera images. If it is now established, for example, that the pattern of the present movements is typical of a tree, and not of a pedestrian, the classification may be accordingly corrected.

The analysis of the events with respect to present movements, and/or the evaluation of the present movements with respect to an impending movement or change of state, may in particular be carried out using an artificial neural network. Here, in particular, a convolutional neural network (CNN), or a recurrent neural network (RNN), may be used. The analysis and evaluation, however, may also be carried out in a model-based manner, for example.

The time horizon for the prediction of an impending movement or change of state of an object may, for example, be between 1 and 3 seconds. The computing power required for this may be provided by conventional control units.

Further measures improving the present invention are shown hereafter in greater detail together with the description of the preferred exemplary embodiments of the present invention based on the figures.

DETAILED DESCRIPTION OF EXAMPLE EMBODIMENTS

Figure 1:
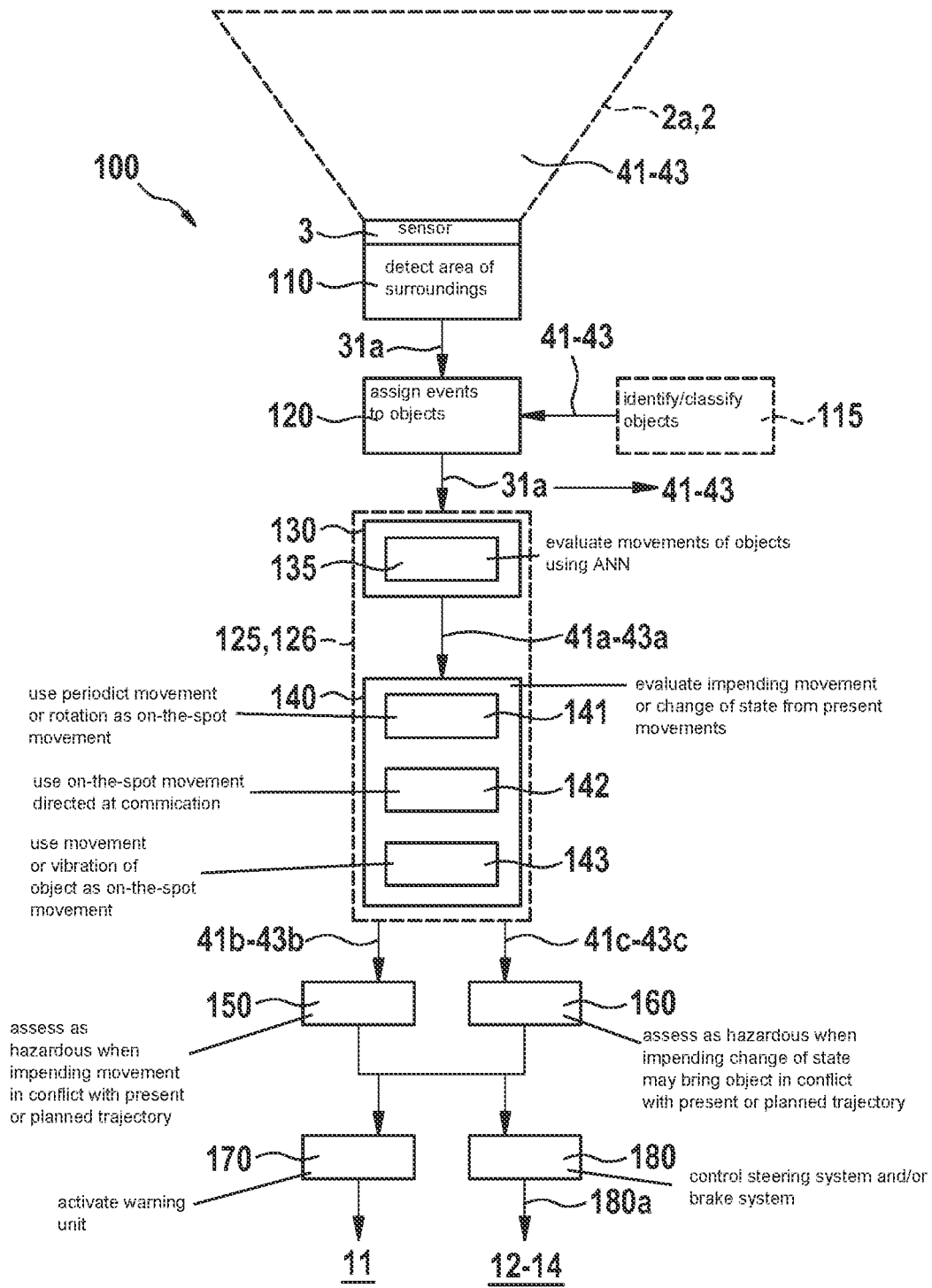
FIG. 1 shows an exemplary embodiment of method 100 in accordance with the present invention.

According to FIG. 1, in step 110 of method 100, initially area 2a of surroundings 2 of a vehicle 1 not shown in FIG. 1 is detected using event-based sensor 3. In step 120, events 31a reported by sensor 3 are assigned to objects 41-43 in area 2a, it also being possible to use camera images of area 2a in optional step 115 for identifying and/or classifying objects 41-43.

In step 130, present movements 41a-43a of objects 41-43 from events 31a are evaluated, which are each assigned to objects 41-43. This may, in particular, take place according to step 135 using an artificial neural network (ANN).

In step 140, an impending movement 41b-43b, and/or an impending change of state 41c-43c, of objects 41-43 is/are evaluated from present movements 41a-43a, such as on-the-spot movements. In the process, for example according to step 141, a periodic movement of at least one body part of a person or an animal 42, and/or a rotation of person or animal 42 or of a body part thereof, may be used as on-the-spot movement 42a. As an alternative or in combination, for example according to step 142, an on-the-spot movement 42a of person 42 that is directed at communication may be used. As an alternative or in combination, for example according to step 143, a movement or a vibration of a portion 41d of an object 41 not shown in FIG. 1 in relation to the remainder of object 41 may be used as on-the-spot movement 41a.

According to optional step 125, rigid objects may be excluded from determination 130 of on-the-spot movements 41a-43a and their subsequent evaluation 140, it being possible to activate this exclusion according to optional step 126 as a function of the road category of the road negotiated by vehicle 1.

According to step 150, an object 41-43 is assessed as hazardous when its impending movement 41b-43b is in conflict with the present or planned trajectory 1a of vehicle 1, which is not shown in FIG. 1.

According to step 160, an object 41-43 is assessed as hazardous when its impending change of state 41c-43c has the potential to bring at least a portion of object 41-43 in conflict with the present or planned trajectory 1a of vehicle 1.

In response to the establishment that an object 41-43 is hazardous or at-risk, according to step 170 a warning unit 11 of the vehicle may be activated and/or, according to step 180, a drive system 12, a steering system 13, and/or a braking system 14 of vehicle 1 may be controlled by an intervention 180a.

Figure 2:
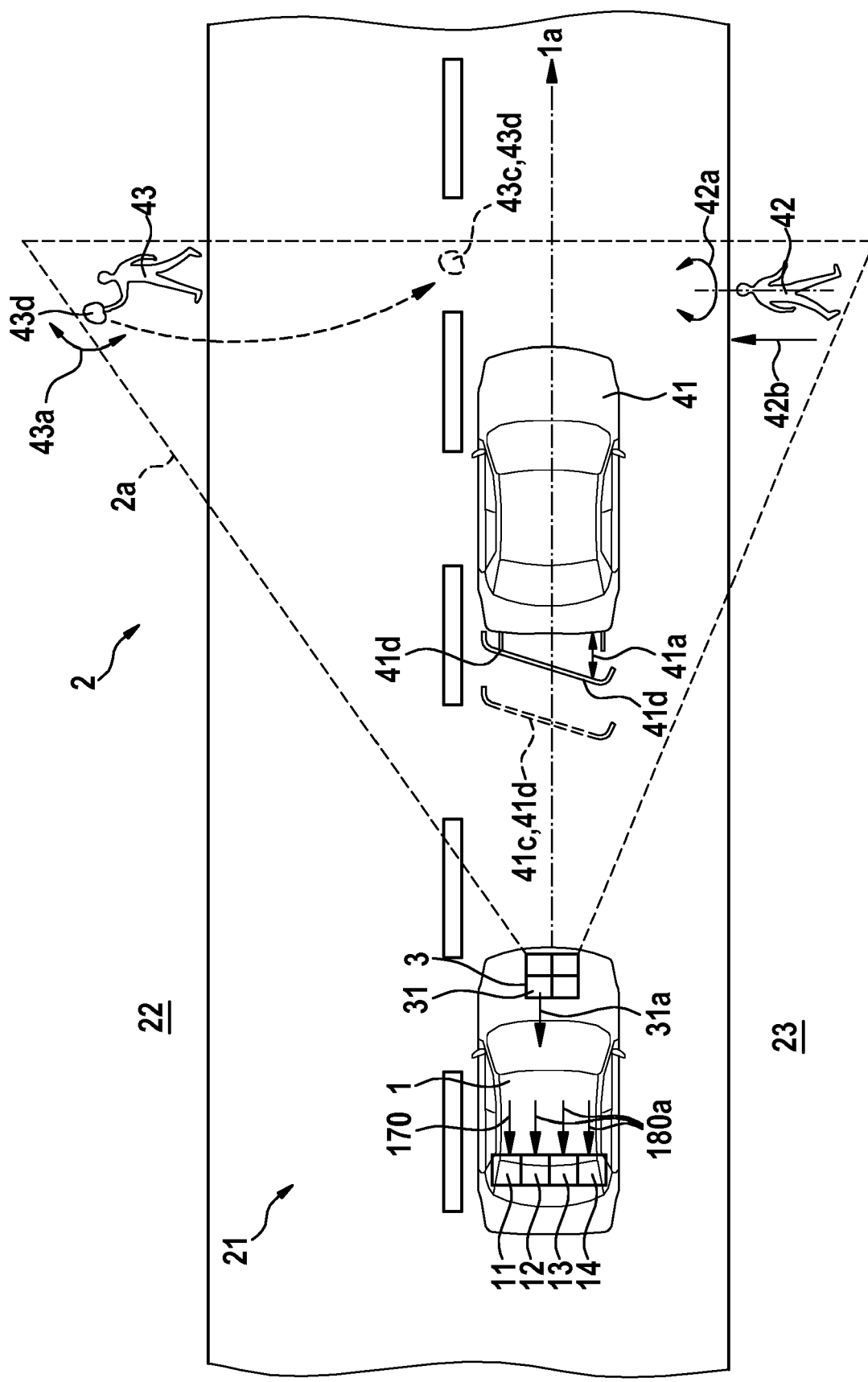
FIG. 2 shows an exemplary traffic situation in which method 100 acts advantageously, in surroundings 2 of a vehicle 1.

FIG. 2 shows an exemplary traffic situation in surroundings 2 of a vehicle 1. Vehicle 1 is driving along a trajectory 1a on a road 21 which is lined by sidewalks 22 and 23. An area 2a of surroundings 2 is detected with the aid of event-based sensor 3 divided into light-sensitive pixels 31. Three objects 41-43 are relevant in the situation shown by way of example.

A preceding vehicle 41 has a bumper 41d, whose lower end has broken off its mounting. As a result of the driving dynamics, bumper 41d carries out a vibration movement which is shown highly exaggerated and is to be regarded as a whole as on-the-spot movement 41a of vehicle 41. From this on-the-spot movement 41a, it may be inferred, as impending change of state 41c of vehicle 1, that bumper 41d will detach entirely from vehicle 41 soon and fall onto road 21 (shown with dotted lines in FIG. 2).

A first person 42 on sidewalk 23 carries out a rotation about his or her own axis as on-the-spot movement 42a. From this, it may be inferred, as impending movement 42b of person 42, that he or she will walk onto road 21 soon.

A second person 43 on sidewalk 22 carries out a winding-up movement with a rock 43d as on-the-spot movement 43a. From this, it may be inferred, as impending change of state 43c of person 43, that he or she will dispose of rock 43d by throwing so that rock 43d lands on road 21 or even impacts vehicle 1 (shown with dotted lines in FIG. 2).

What is claimed is:

1. A method for identifying potentially hazardous or at-risk objects in surroundings of a vehicle, comprising the following steps:
   detecting an area of the surroundings using at least one event-based sensor, the event-based sensor including light-sensitive pixels, for respective ones of which the sensor is configured to output respective events assigned, respectively, to the respective pixels in response to respective relative changes of light intensity incident upon the respective pixels by at least a predefined percentage;
   assigning the respective events output by the sensor to objects in the detected area; and
   for each of at least one object of the objects to which one or more of the events are assigned:
   analyzing the one or more of the events assigned to the at least one object, thereby determining a present in-place movement of the respective object in which a place of the respective object subsequent to the movement and prior to the movement is at least partially the same; and
   ascertaining, from the present movement, an impending movement of the respective object into another place that conflicts with a present or planned trajectory of the vehicle and/or an impending change of state of the respective object causing a presence in the other place that conflicts with the present or planned trajectory of the vehicle.

2. The method as recited in claim 1, further comprising outputting a warning of presence of a hazardous or at-risk object in response to the conflict of the ascertained impending movement of the respective object into the other place.

3. The method as recited in claim 1, further comprising outputting a warning of presence of a hazardous or at-risk object in response to the conflict of the ascertained impending change of state of the respective object.

4. The method as recited in claim 1, wherein rigid objects are excluded from the analysis and from an evaluation by which the ascertainment is made.

5. The method as recited in claim 4, wherein the exclusion is activated as a function of a road category of a road negotiated by the vehicle.

6. The method as recited in claim 1, wherein one of the at least one object is a person or an animal, and the impending movement of the person or animal and/or the change of state of the person or animal is ascertained from a change in amplitude and/or a frequency of a periodic movement, and/or a rotation of at least one body part of the person or animal is the present in-place movement of the one of the at least one object.

7. The method as recited in claim 1, wherein one of the at least one object is a person, the in-place movement is a communication of the person in a spatial direction, and the ascertainment is of the impending movement, which is a movement of the person in the spatial direction.

8. The method as recited in claim 1, wherein, for one of the at least object, the in-place movement of the object is a vibration of the object, and the ascertainment is of the impending change of state of the object, the change of state being of an ascertained detachment of a portion of the object from a remainder of the object.

9. The method as recited in claim 1, further comprising:
   in response to the ascertained conflicting impending movement and/or impending change of state object being assessed as hazardous or at-risk:
   (i) activating a warning unit which is physically perceptible to a driver of the vehicle; and/or
   (ii) performing an intervention that controls a drive system, a steering system, and/or a braking system of the vehicle to avoid a collision or mitigate consequences of the collision.

10. The method as recited in claim 1, wherein the analysis is carried out using an artificial neural network.

11. A non-transitory machine-readable storage medium on which is stored a computer program for identifying potentially hazardous or at-risk objects in surroundings of a vehicle, the computer program, when executed by a computer, causing the computer to perform the following steps:
   detecting an area of the surroundings using at least one event-based sensor, the event-based sensor including light-sensitive pixels, for respective ones of which the sensor is configured to output respective events assigned, respectively, to the respective pixels in response to respective relative changes of light intensity incident upon the respective pixels by at least a predefined percentage;

assigning the respective events output by the sensor to objects in the detected area; and for each of at least one object of the objects to which one or more of the events are assigned:

analyzing the one or more of the events assigned to the at least one object, thereby determining a present in-place movement of the respective object in which a place of the respective object subsequent to the movement and prior to the movement is at least partially the same; and ascertaining, from the present movement, an impending movement of the respective object into another place that conflicts with a present or planned trajectory of the vehicle and/or an impending change of state of the respective object causing a presence in the other place that conflicts with the present or planned trajectory of the vehicle.

12. The method of claim 1, further comprising:

prior to the assigning, estimating identifications of the objects based on the events without analysis of structures in images, wherein the assigning, analyzing, and ascertaining are performed using the objects according to the estimated identifications; and subsequent to the ascertaining:

performing a structure analysis on an image of the area of the surroundings, thereby classifying the objects; and based on the classification, modifying results of the ascertainment.

13. The method as recited in claim 12, wherein the image is a camera image and the structure analysis includes a segmentation of each of at least one of the objects into individual parts.

* * * * *